May 10, 1949.    A. W. PAYNE ET AL    2,469,406
APPARATUS FOR BENDING TUBING INTO SERPENTINE
COILS AND SWEEP MECHANISM AND INDEX THEREFOR
Filed May 15, 1947    6 Sheets-Sheet 1

INVENTORS
Arthur W. Payne &
Arthur M. Wallace.
BY
Barnes, Kisselle, Laughlin & Raisch
ATTORNEYS.

May 10, 1949.  A. W. PAYNE ET AL  2,469,406
APPARATUS FOR BENDING TUBING INTO SERPENTINE
COILS AND SWEEP MECHANISM AND INDEX THEREFOR
Filed May 15, 1947  6 Sheets-Sheet 2

INVENTORS
Arthur W. Payne &
Arthur M. Wallace.
BY
Barnes, Kisselle, Laughlin & Raisch
ATTORNEYS.

INVENTORS
Arthur W. Payne &
Arthur M. Wallace
BY
Barnes, Kisselle, Laughlin & Raisch
ATTORNEYS.

May 10, 1949.  A. W. PAYNE ET AL  2,469,406
APPARATUS FOR BENDING TUBING INTO SERPENTINE
COILS AND SWEEP MECHANISM AND INDEX THEREFOR
Filed May 15, 1947  6 Sheets-Sheet 4

INVENTORS
Arthur W. Payne &
Arthur M. Wallace
BY
Barnes, Kisselle, Laughlin & Raisch
ATTORNEYS.

Patented May 10, 1949

2,469,406

UNITED STATES PATENT OFFICE 2,469,406

APPARATUS FOR BENDING TUBING INTO SERPENTINE COILS AND SWEEP MECHANISM AND INDEX THEREFOR

Arthur W. Payne and Arthur M. Wallace, Detroit, Mich., assignors to Bundy Tubing Company, Detroit, Mich., a corporation of Michigan Application May 15, 1947, Serial No. 748,312

15 Claims. (Cl. 153—46)

This invention relates to an apparatus for bending long work pieces, such as tubing, into the shape of serpentine coils having a series of oppositely formed bends.

In a co-pending application, Serial No. 687,668, filed August 1, 1946, and issued as Patent No. 2,454,290 on November 23, 1948, there is disclosed, a bending mechanism for forming long work pieces into serpentine coils. Briefly, such an apparatus involves a bending mechanism located more or less centrally of a table and the elongated stock or tube is fed thereto. The bending mechanism operates to form a bend in the stock; then the stock is fed forwardly again; the bending mechanism operates in another direction to form a reverse bend in the stock and this action continues until the desired serpentine form is produced. As the bending mechanism operates to form the bends, first in one direction, and then the other, the formed coil is oscillated with the bending mechanism as the coil is supported on the surface of the table. Where a coil is formed having reverse bends of substantially 180° each, the coil is swung in one direction about 180°, and then when the next successive bend is made, the coil is swung in the opposite direction about 180°. In fact the coil is swung in excess of 180° in view of the fact that the spring back tendency of the metal must be accounted for to obtain a bend of substantially 180°.

Now, it will be appreciated that in order to achieve a desired rate of production that the machine must function rather rapidly, with the result that the coil is whipped back and forth rapidly with the movements of the bending mechanism. This can be accomplished with coils where the length of the runs are not too long and the tube is of adequate size, but where the runs between the bends are rather long or where the tube is rather small in cross section and, accordingly, rather weak insofar as resisting bending action is concerned, or where a coil is made which involves a large number of runs and reverse bends, the rapid oscillation or whipping action results in bending or distorting the coil.

The general object of the present invention is to provide a sweep mechanism which has a sweeping action substantially corresponding to that of the bending mechanism, and which sweep engages and supports the portions of the coil as it is being formed to prevent the same from becoming distorted or otherwise bent or rendered defective.

It will be understood that the bending action of the above mentioned application has a position of rest at which time the stock is fed to the machine, and then the mechanism is operated in one direction to form a bend. Following this, the mechanism comes back to the rest position for the feeding of the stock and then the mechanism moves from the position of rest in the opposite direction to form the next bend. Therefore, it will be appreciated that the bending mechanism moves back to the rest position between each bending operation. Inasmuch as the bending mechanism is strongly constructed and that the parts thereof are on a small radius, the movement back to the rest position can be very quickly accomplished. However, the sweep mechanism, although of relatively light construction, necessarily involves structure having relatively great radius in order to engage and support the coil. Due to the greater radius and other factors, the sweep cannot be accelerated or decelerated and brought to a stop as quickly as can the bending mechanism. Accordingly, the present invention has as its general object, the provision of a sweep mechanism and operating parts therefor which partake of only some of the movements of the bending mechanism. To this end, the sweep structure moves with the bending mechanism during a bending operation but has no movement when the bending mechanism moves back to its position of rest. This represents a considerable saving of production time. Other objects will become apparent as the following detailed description is considered and these objects involve various improvements which include, by way of example, novel checking and detent means for stopping and properly locating the sweep structure at the ends of its sweeping movement.

An apparatus constructed in accordance with the invention is shown in the accompanying drawings wherein.

Figure 1:
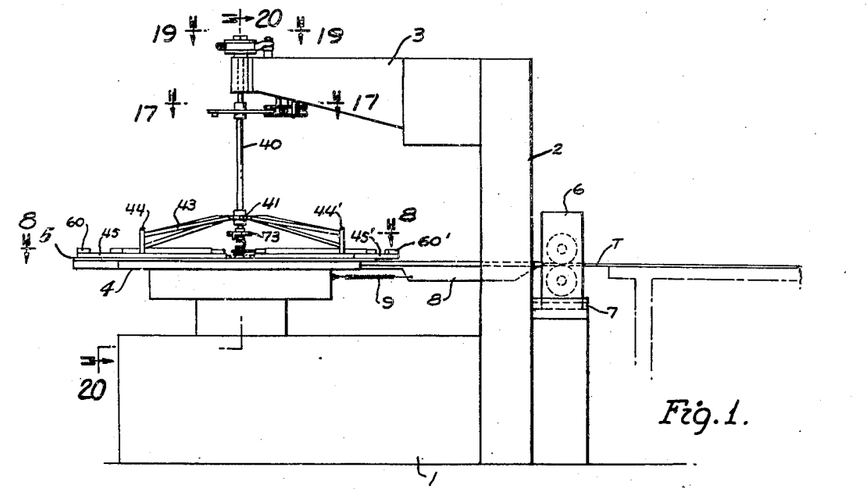
Fig. 1 is a somewhat diagrammatic side elevational view of a bending machine constructed in accordance with the invention.
Figure 8:
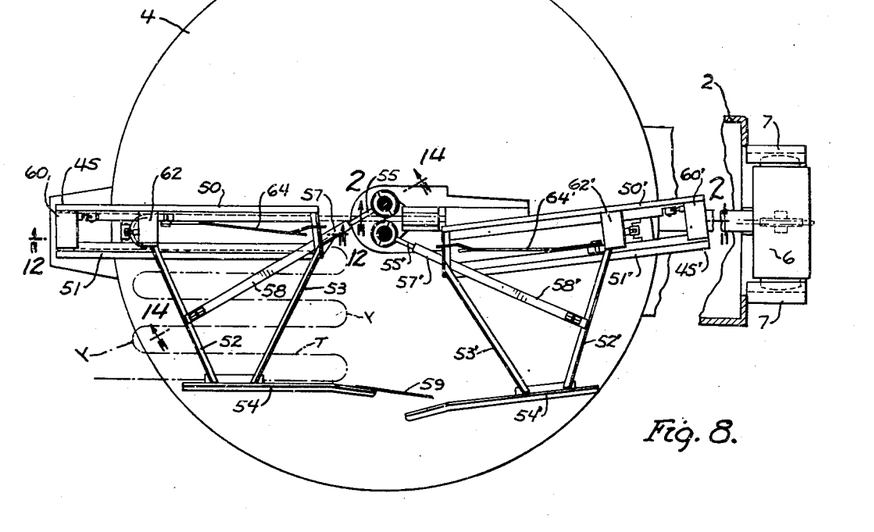
Fig. 8 is a somewhat schematic view in plan showing the work table, the bending mechanism, and the sweep.

As illustrated in Fig. 1, the machine comprises a base 1 with a pedestal 2 which carries an overhanging arm 3 while the base supports what may be termed a work table 4. The table 4 may have a projecting support 5. The work piece which may by a tube T, is fed into the machine by a driving unit 6 provided with driving rolls. This unit is slidably mounted as at 7 and the mounting also provides for a rocking action of the unit as shown in Fig. 8. Attached to the unit is a forwardly extending swing bar 8 urged to the left, as Fig. 1 is viewed, by a spring 9. This normally holds the swing bar against a stop 10.

Figure 2:
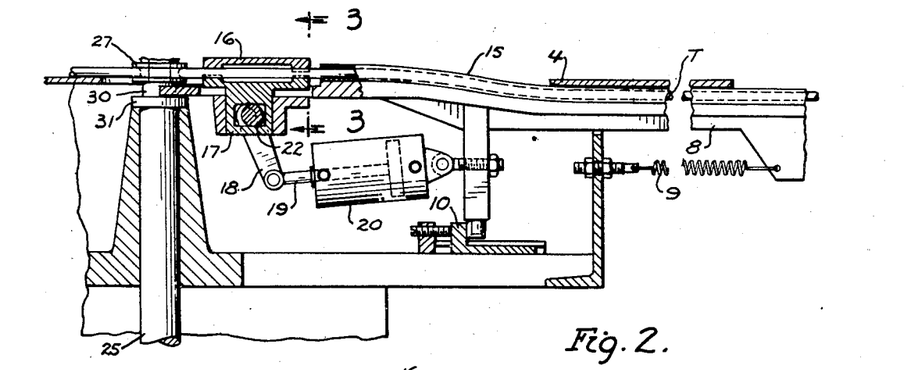
Fig. 2 is an enlarged cross sectional view taken through the bending mechanism and showing the clamp structure.
Figure 3:
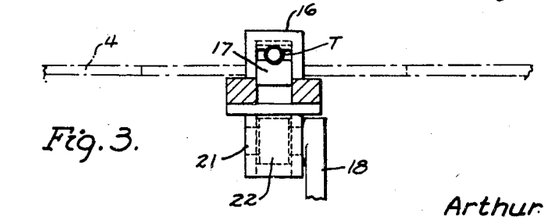
Fig. 3 is a cross sectional view taken substantially on line 3—3 of Fig. 2 showing a clamp.

As illustrated in Figs. 4 to 7 inclusive, the swing bar 8 is provided with a fork at its forward end, as shown at 12, having two recesses 13 and 14 therein and the tube T is guided along the swing bar through a guide pipe 15. Near the forward end of the swing bar is a clamping member residing in an upper clamping member 16 and a movable clamping element 17 which is actuated by a crank arm 18 attached to piston rod 19 of a piston in an air cylinder 20 (Fig. 2). The crank arm is journalled in the fixed portion of the clamp 16 as shown at 21 (Fig. 3) and it has a cam element 22 which serves to shift the clamp member 17 when the same is rocked.

The base of the machine supports the main shaft 25 which carries, at its upper end, two bending rollers 26 and 27. The rollers are grooved as shown at 28, to receive the tube, and they are provided with bearing portions 30 for seating respectively in the notches 13 and 14 of the swing bar. The forward end of the swing bar rests upon an enlargement 31 on the main shaft 25 with the swing bar yieldably held against the stop 10. In this position, the notches or recesses 13 and 14 are in position to be engaged by the bearing portions 30 of the bending rollers 26 and 27 as the main shaft oscillates in the operation of the machine, as will presently be seen.

Figures 4, 5, 6:
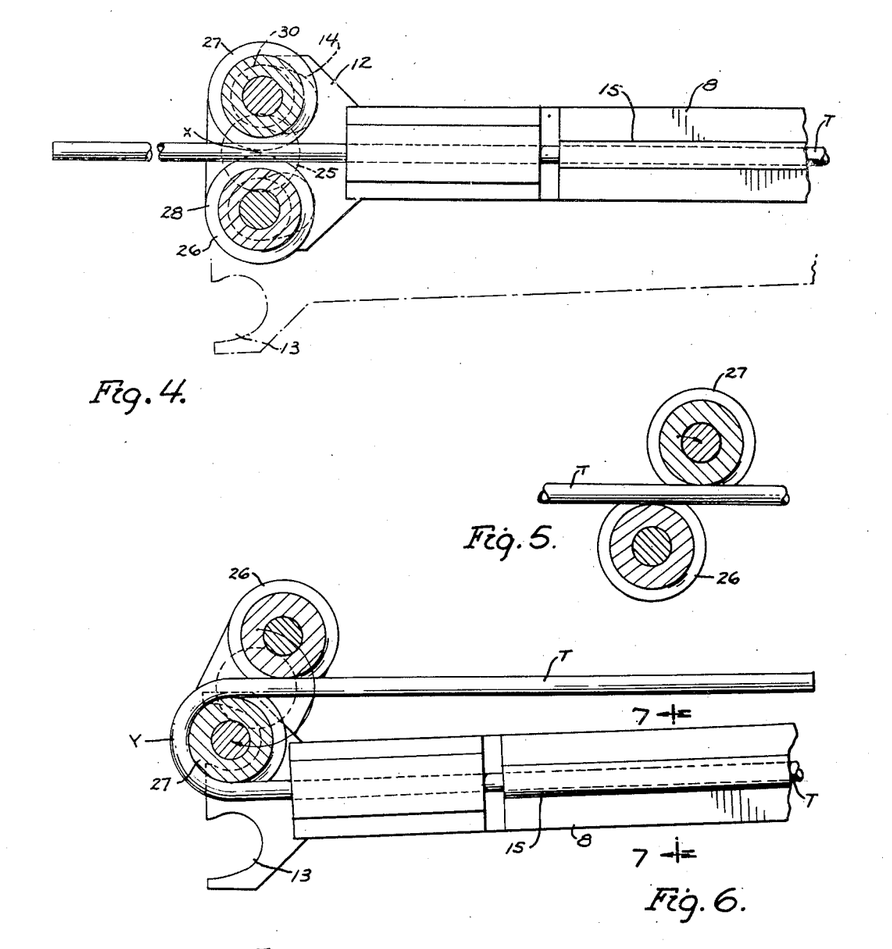
Fig. 4 is a plan view somewhat diagrammatic in nature showing the rest position of the rollers of the bending head and illustrating a cooperating fork structure.
Fig. 5 is a view of the bending rollers showing an angular position they may take when the work piece is initially engaged to commence the bending action.
Fig. 6 is a view similar to Fig. 5 showing the position of the bending mechanism at the completion of a 180° bend.
Figure 7:
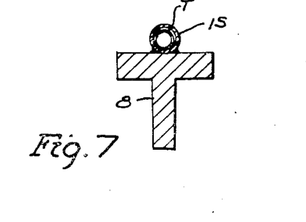
Fig. 7 is a sectional view taken on line 7—7 of Fig. 6 showing the guiding of the tube.

The bending mechanism is shown in its rest position in Fig. 4, in which position the tube may be advanced between the rollers as illustrated. When the tube has been sufficiently advanced the clamp 16, 17 is applied to the tube and the shaft 25 is oscillated. This shifts the rollers about the center $x$ of the shaft 25. If the shift be clockwise, as Fig. 4 is viewed, the bending means moves first to a position as indicated in Fig. 5 before a purchase is obtained on the tube to start bending it. As the movement continues the roller 26 serves as a forming roller and bends the tube around the roller 27 until the rollers finally reach a position shown in Fig. 6 thus forming a bend of about 180°. In this action, since the roller 27 is seated in the notch 14, the swing bar is oscillated and also pushed slidingly back against the action of the spring 9. The notched fork 12 thus follows the swinging movement. This forms a bend $y$ in the tube T.

The shaft 25 is now oscillated back from the Fig. 6 position to the rest position shown in Fig. 4, with the notched fork at the end of the swing bar maintaining its contact with the roller 27. The tube is now advanced and the next bending action is by a counter-clockwise rotation of the shaft 25 at which time the roller 27 forms the tube about the roller 26. In this action the portion 30 of the roller 26 seats in the notch 13 so that the swing bar is reciprocated and oscillated in this movement. At the end of this second bending operation, the parts are in a position just opposite that shown in Fig. 6. Following this second bending operation, the bending mechanism moves back to the rest position, shown in Fig. 4, and the tube is again advanced. It should be stated that while a bending operation is being performed, the clamp 16, 17 is applied strongly to the tube to hold it in position. As the bending head approaches the rest position shown in Fig. 4, the clamp is released to permit necessary movement of the tube as the head moves back to rest position and so that the tube may again be advanced by the propelling means 6.

By continued operation of the machine in the above fashion, the serpentine form is made, as shown by the broken lines in Fig. 8, with the serpentine coil having a series of reverse bends $y$. It will also be appreciated, particularly from consideration of Fig. 8, that when the bending mechanism operates to perform a bend, that the formed portions of the serpentine coil must be swung first in one direction and then the other with the bending mechanism while the coil is resting upon the table 4. It will, of course, be understood that when a bend of about 180° is made, that the coil must be swung about 180° in one direction and then 180° in the opposite direction. In fact, this movement exceeds 180° in order to accommodate for the spring back tendency of the metal.

The above relatively brief description is concerned with the bending mechanism as disclosed in more detail and claimed in the above mentioned copending application Serial No. 687,668. This description, it is believed, will suffice for giving the basic manner of operation of the bending mechanism and the remaining structure to be described has to do with the sweep for engaging and supporting the coil portions as the same are swung from side to side in the operation of the machine.

Figures 15, 16:
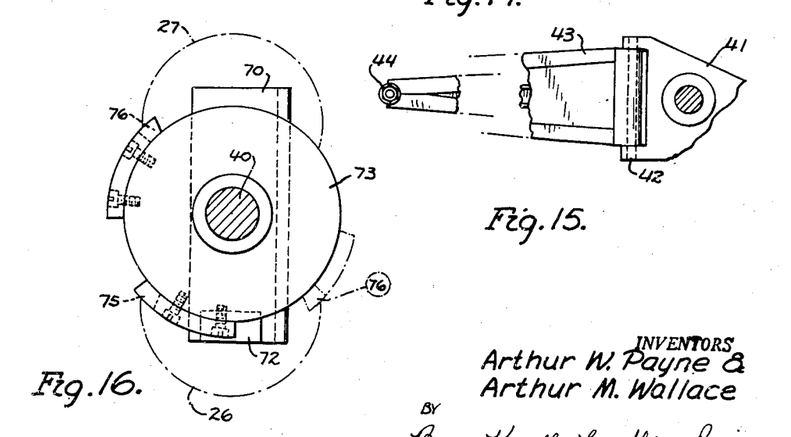
Fig. 15 is a sectional view looking on line 15—15 of Fig. 14 showing the mounting for the sweep structure.
Fig. 16 is a sectional view taken substantially on line 16—16 of Fig. 14 showing the drive through which the bending mechanism operates the sweep structure.

Rotatably mounted upon and depending from the overhanging arm 3 is an oscillatory shaft 40 (Fig. 1), the lower end of which supports the sweep structure. There are, in fact, two sweep structures to which, for convenience, the same reference characters will be applied to like parts with the characters on one sweep structure carrying the addition of a prime mark. A bracket 41 is secured to the shaft 40 and extending outwardly therefrom on a pivotal connection 42 is a supporting arm structure 43 with a terminal piece 44 connected to the sweep, generally indicated at 45, with a universal type connection, such as a ball and socket joint 46. The arm structure 43 is of yoke formation, as shown in Fig. 15, so as to provide strength against the torque load encountered thereby.

Figures 13, 14:
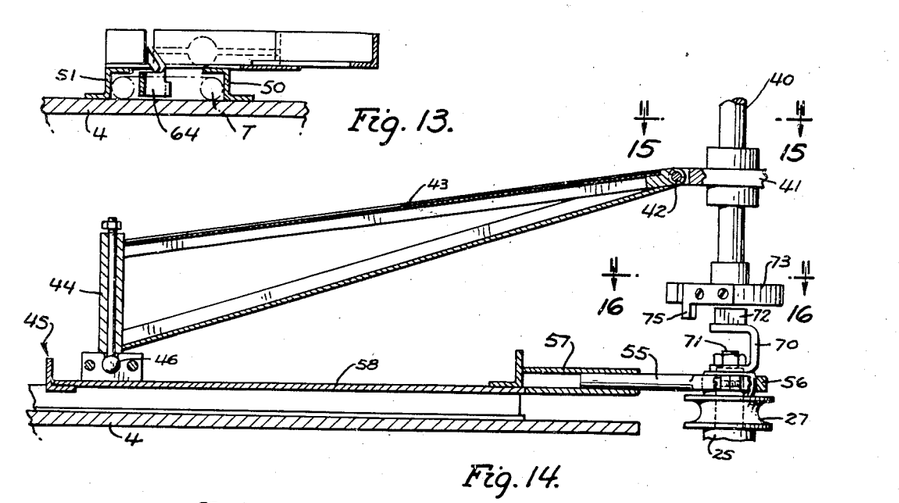
Fig. 13 is a sectional view taken substantially on line 13—13 of Fig. 12.
Fig. 14 is an enlarged sectional view on line 14—14 of Fig. 8 illustrating features of the sweep structure and showing the drive therefor.

Each sweep structure comprises essentially a pair of sweep members 50 and 51 arranged to rest upon and substantially wipe along the surface of the table 4 and laterally extending arms 52 and 53 which carry an outward or side board sweep member 54. To hold the sweep member in proper position, because of the universal joint 46, each sweep member is connected to the axis of one of the forming rollers as shown in Figs. 8 and 14. This takes the form of a slip joint comprising a rod 55 connected to the axis member of the roller, as shown at 56, and which has a slidable connection with the tubular formation 57 which may be positioned in line with a brace member 58. One of the sweeps may have an extending leaf spring arm 59 which overlaps the other sweep.

Associated with each sweep member are suitable control switches, such as the switch 60, having a switch arm 61 and switch 62 having a switch arm 63. Between the arms 50 and 51 is a guide element 64 more or less angularly disposed and it is loosely mounted so that it may be easily raised and lowered as, for example, on a slotted connection 65. The end of this arm which extends inwardly toward the bending mechanism has an inclined end 66.

Figure 12:
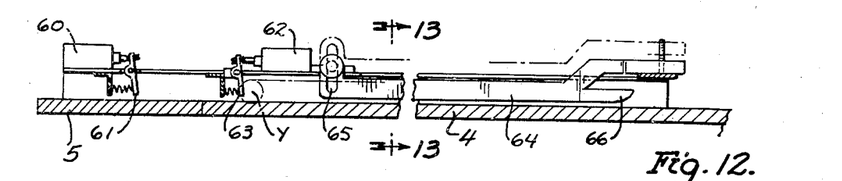
Fig. 12 is an enlarged cross sectional view taken substantially on line 12—12 of Fig. 8 showing some of the sweep structure and showing the control stop switches.

As will be seen by reference to Fig. 8, the end of the tube in the coil projects beyond the bends y. This may or may not be desired in some constructions. However, if it is desired, the angular guide 64 engages and guides the leading end of the tube so that it will lie close to the sweep member 50 (Fig. 13) and move past the switch arm 63 to engage the arm and actuate switch arm 61 (Fig. 12). This stops the feeding action of the tube. After the first bend has been made, and, in fact, after any number of bends have been made, a bend is advanced between the sweep members 50 and 51 as is shown in dotted lines in Fig. 10, and the bend rides under the end 66 of the guide arm 64 and raises the same and the feeding action is stopped when the bend, as shown in dotted lines in Fig. 13, strikes at switch arm 63. As mentioned, there are two sweep structures of similar or identical construction and substantially oppositely positioned as shown in Fig. 8.

The sweep structure is oscillated by the bending mechanism and for this purpose there is a driving element 70 (Figs. 14 and 16) which is mounted upon the shaft 25 above the rollers 26 and 27. In fact, the driving element 70 may be bolted in position on the upper ends of the roller pintles as indicated at 71. This driving element has an upstanding driving lug 72. The lower end of the shaft 40 (Fig. 14) is provided with a driving member 73 having two depending driving lugs 75 and 76 thereon. These lugs 75 and 76 are positioned to be engaged by the lug 72 to thus turn the shaft 40 with movements of the bending mechanism. It will be immediately appreciated that there is some lost play and, indeed, some movement of the bending mechanism permitted without movement of the sweep structure as will be presently seen.

Figure 10:
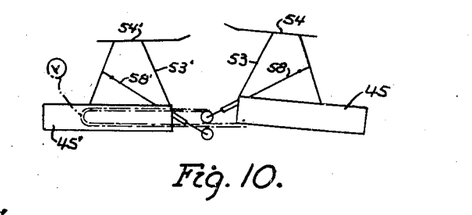
Fig. 10 is a diagrammatic view similar to Fig. 9 showing substantially the bending mechanism moved back to rest position with the sweep remaining substantially in the position shown in Fig. 9.

As illustrated in Fig. 8, the bending mechanism is in rest position and at this time the unbent leading end of the tube is advanced into the sweep 45 and the feeding action is discontinued when the leading end trips the switch 60. In the rest position the extension 5 supports the outer end of a sweep member. The clamp is now applied to the tube and a bend is made by a clockwise motion of the bending head, as Fig. 8 is viewed, and as Figs. 4, 5 and 6 are viewed. As the bending mechanism starts to move, it has a lost play movement from the Fig. 4 position to substantially the Fig. 5 position to take up the play that the tube has between the rollers 26 and 27, and when the Fig. 5 position is reached, the bending action starts. During this lost play motion the driving member 70 (Fig. 16) is moving with the shaft 25 and the lug 72 picks up and drives the lug 75 at just about the time the rollers reach the Fig. 5 position. At the end of this bending action, wherein the bending mechanism is in the position shown in Fig. 6, the two sweep structures have been reversed in position and are now in the position shown in Fig. 10. Also, the driving lug 76 (Fig. 16) is approximately in the dotted line position, as shown in Fig. 16. At this time the bending mechanism is moved reversely from the Fig. 6 position back to the Fig. 4 position. In this action, the driving member 70 moves freely without movement of the shaft 40 with the result that the lug 72, in the rest position, lies in the full line position shown in Fig. 16. The tube is now advanced into the sweep 45′, as indicated in Fig. 10, until the leading bend actuates the switch 62′ to stop the feeding action. It will be understood that the clamp 16, 17 is released not only to permit the bending head to move back to the Fig. 4 position but to permit advancement of the tubes.

The bending mechanism is now operated in the reverse direction or counter-clockwise as the several figures are viewed, and as the bending rollers move through the lost play action, the lug 72 moves into engagement with the lug 76. As the bending action continues the shaft 40 is rotated to swing the sweep structures from the Fig. 10 position counter-clockwise to the Fig. 11 position. Accordingly, a second bend is made in the stock. The succeeding operation is that of the return of the bending mechanism back to the rest position shown in Fig. 4, accompanied by the release of the clamp and followed by another advance of the stock. This time, the second made bend is advanced between the members 50 and 51 of the sweep 45 and the advancement ceases upon the tripping of the switch 62. Subsequently, another bend is made by a clockwise operation of the bending mechanism.

Figure 9:
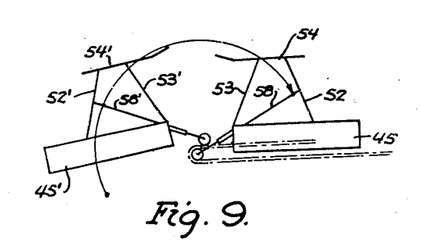
Fig. 9 is a diagrammatic view showing substantially the position of the parts following the completion of a bend by a clockwise movement of the bending mechanism.
Figure 11:
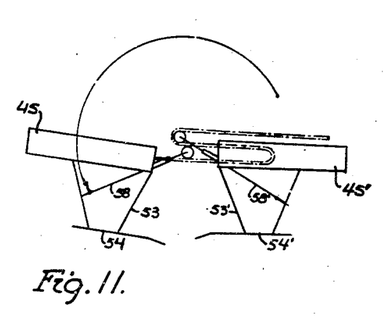
Fig. 11 is a view similar to Fig. 9 showing the completion of a bend made by a counter-clockwise movement of the bending mechanism.

Briefly, reiterating, relative to the positions shown in Figs. 8 to 11 inclusive, it might be stated that Fig. 8 shows the sweeps in the rest position of the bending mechanism with the sweeps in a position for the advancement of the tube into the sweep 45. Fig. 10 shows substantially a reversed position with the bending mechanism in the rest position and with the sweep in position for advancement of the tube into the sweep 45'. Fig. 9 shows the position of the parts at the completion of a bend made by a clockwise movement of the bending mechanism in which movement the coil was supported by the sweep structure 45. Fig. 11 shows the position of the parts at the completion of the bend made by a counterclockwise movement of the bending mechanism in which movement the coil was supported by the sweep structure 45'.

As the coil builds up, in the operation of the machine, the runs of the coil are supported not only by the sweep elements 50 and 51 of the sweep 45 but also by the outboard sweep member 54. The same thing is true when the sweep 45' functions, the runs and bends being supported by the sweep portions 50', 51' and 54'. The outboard sweep 54 and 54' may be bent as shown in Fig. 8, and spring arm 59 closes the gap therebetween so that, for example, as the coil shown in dotted lines in Fig. 8, is advanced into the sweep 45, its outermost run is guided so as to be maintained within the outboard sweep member 54.

Figure 17:
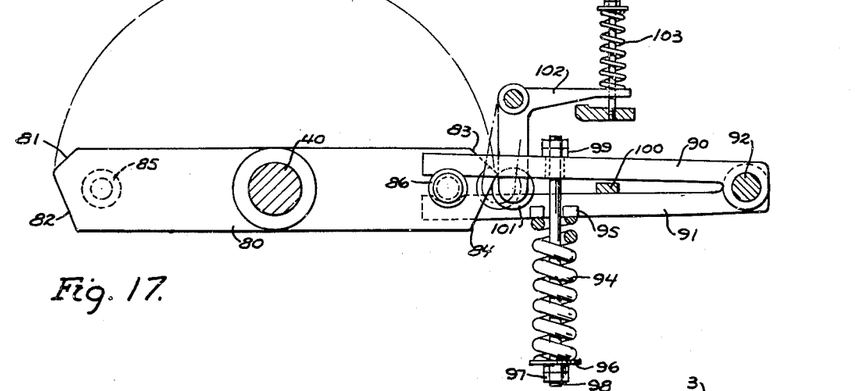
Fig. 17 is an enlarged view taken substantially on line 17—17 of Fig. 1 showing the indexing means for the sweep structure.
Figure 18:
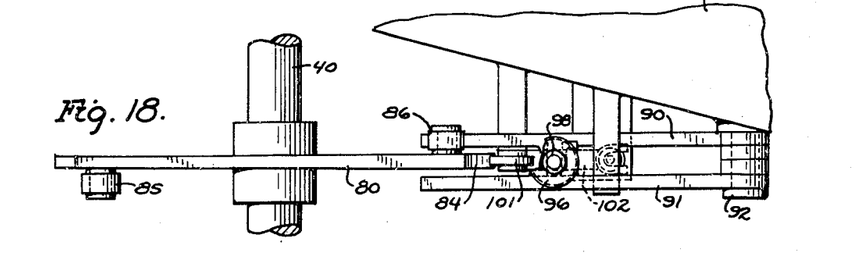
Fig. 18 is a view showing the indexing means from the side.
Figure 19:
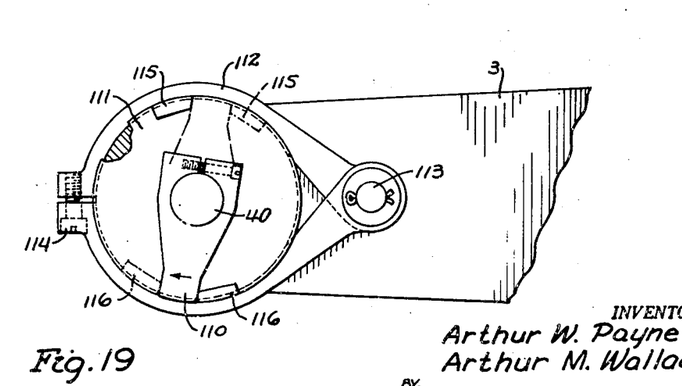
Fig. 19 is a view taken on line 19—19 of Fig. 1 showing a friction brake arrangement for aiding in bringing the sweep structure to a stop following one of its swinging movements.
Figure 20:
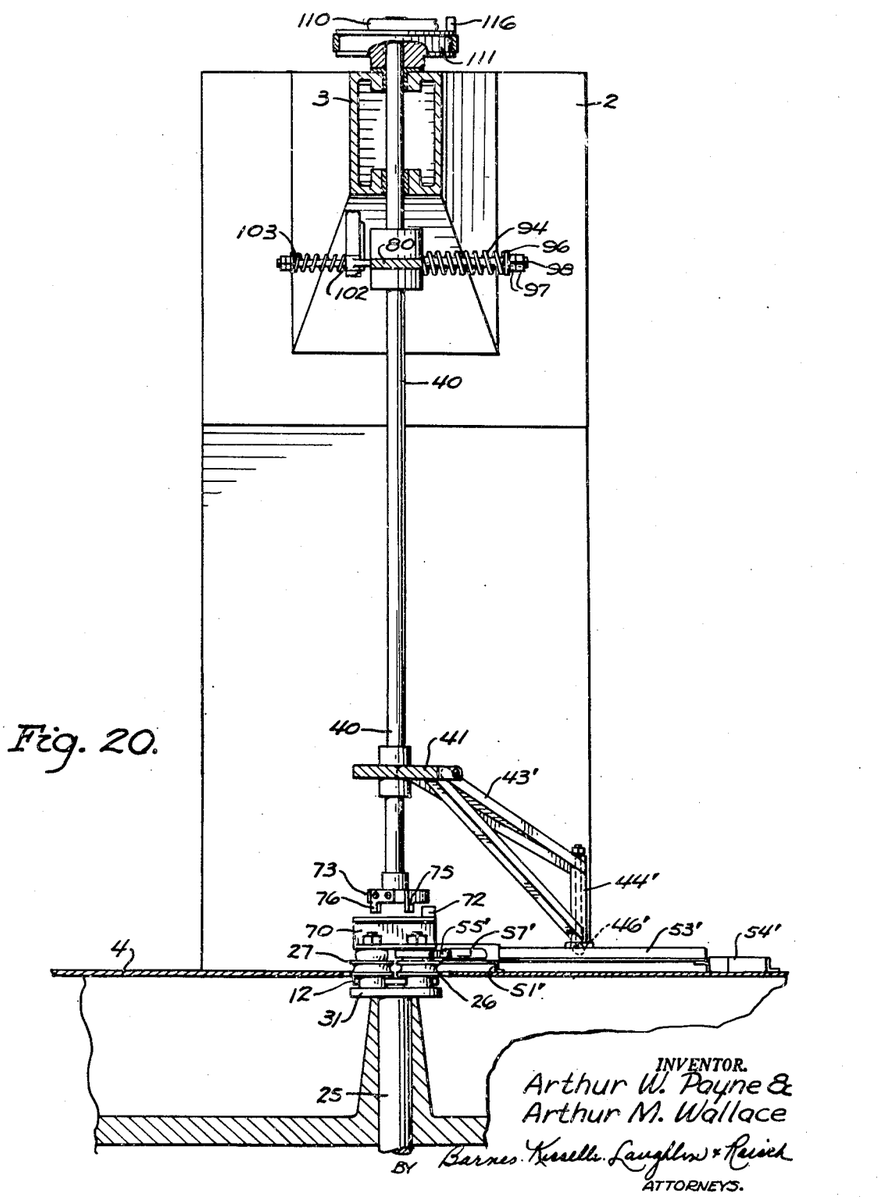
Fig. 20 is an enlarged vertical transverse section taken substantially on line 20—20 of Fig. 1 showing the drive shaft and the shaft for the sweep mechanism.

It is essential, of course, to accurately control the movements of and to index the sweep, and the mechanism for doing this is shown in Figs. 17, 18 and 19. On the shaft 40 is a cross arm 80 with inclined surfaces 81 and 82 on one end and similar inclined surfaces 83 and 84 on its opposite end. The cross arm 80 carries a downwardly extending abutting member 85 and an upwardly extending abutting member 86, these being adjacent opposite ends of the cross member.

A yielding stop structure involves two pivoted arms, one positioned above the other, as shown at 90 and 91, each pivoted as at 92 to the overhanging arm 3. There is a relatively strong spring 94, one end of which abuts elements 95 on the arm 91 and the other end of which reacts against a washer or the like 96 held by nuts 97 on a rod 98. This rod is slidable through an upward projection on the arm 91 and is provided with nuts 99 for reacting against the arm 90. The spring can be tightened by manipulating the nuts. Positioned between the two arms is a fixed stop 100. As the shaft oscillates the cross arm 80 oscillates with it, and the inclined faces 81, 82 and 83, 84 contact with a roller 101 carried by a bell crank 102 acted upon by a relatively light spring 103. The position shown in Fig. 17 shows one of the indexed positions. In arriving at this position, the shaft 40 had its counter-clockwise motion, and the upper projection 86 struck the arm 90 and swung it on its pivot. This action compressed the relatively heavy spring 90 to yieldingly arrest the motion. The spring was compressed because the arm 90 engaged the nuts 99 thus placing the rod 98 under tension and moving the abutment washer 96. The opposite end of the spring, however, was held fixed by the abutment 95 on arm 91 which is, in turn, held in fixed position by the fixed abutment 100. Also, in arriving at this position, the inclined face 83 moved over the roller 91 thus compressing spring 103. Now, it will be appreciated that when these actions occur, there is a rebound action necessarily occurring from the spring 94. This rebound is checked when the inclined face 84 comes into engagement with the roller 100, the checking action being accomplished yieldingly by the spring 103. The parts quickly come to rest in the indexed position shown.

The next movement is that of a clockwise movement. To start the movement, the inclined face 84 must be moved over the roller 101 against the action of the spring 103, but, as said before, the spring 103 is relatively light. After about 180° of movement, the inclined face 81 moves over the roller 103 and the downwardly extending projection 85 strikes the lower arm 91. Again the motion is yieldably checked by compression of the strong spring 94. This occurs because the stop 95 on the swinging arm 91 compresses the spring while the other end of the spring is held fixed through the rod 98, which, in turn, is held fixed by the swinging arm 90 which abuts against the fixed stop 100. The rebound action is again checked as the inclined face 82 comes against the roller 101.

As a further aid in checking the movement, a friction brake structure may be employed as shown in Fig. 19. Mounted on the shaft 40 is an arm 110 for cooperation with an inner brake member 111 mounted within outer brake members 112. The brake members are pivoted at 113 on the overhanging arm 3 and they may be adjusted as to tightness by a bolt 114. The inner brake member has a pair of lugs 115 and 116 arranged to be engaged by the arm 110. The full line position of the parts, as shown in Fig. 19, shows substantially one rest position. As the shaft 40 moves clockwise, the movement is free until near the end thereof when the arm 110 strikes the lug 115. This causes rotation of the inner brake member with the attendant frictional resistance which occurs between the inner and outer brake members. The position of stoppage is indicated by the dotted line position of the lug 115. In this action, of course, arm 110 moves away from the lug 116, but when the arm strikes the lug 115, the inner brake member is moved and the lug 116 is moved to the dotted line position shown. In the reverse or counter-clockwise motion, the arm 110 moves away from the lug 115 and strikes the lug 116 near the end of the counter-clockwise movement, thus causing a frictional braking action as the parts move back to the full line position shown.

It will thus be seen that the two sweeps of the sweep structure function alternately, with the sweep 45 supporting the coil in the clockwise bending movement as Fig. 8 is viewed, and with the sweep 45' supporting the coil in the counterclockwise bending movement. Between each bending operations, the bending mechanism returns to its rest position without movement of the sweep structure. This movement can be made quickly and rapidly without involving movement of the sweep structure which involves a relatively long radius, thus permitting operation of the machine at a rapid rate.

We claim:

1. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure for sweeping the table having two substantially opposite sweeps, driving means between the bending means and the sweep structure operable to swing the sweep structure in a bending operation so that one sweep supports the formed coil portions while the other sweep moves substantially to a rest position for receiving the advancing tube and coil portions, said driving means being operable for movement of the bending means back to rest position independently of movement of the sweep structure.

2. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure for sweeping the table having two substantially opposite sweeps, driving means between the bending means and the sweep structure operable to swing the sweep structure in a bending operation so that one sweep supports the formed coil portions while the other sweep moves substantially to a rest position for receiving the advancing tube and coil portions, said driving means being operable for movement of the bending means back to rest position independently of movement of the sweep structure, said driving means being operable to swing the sweep structure in the opposite direction in the next succeeding bending operation so that the second mentioned sweep supports the coil portions with the first mentioned sweep moving to rest position, and said driving means being operable for movement of the bending means back to rest position independently of movement of the sweep structure.

3. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely positioned sweeps, one sweep for supporting the coil portions in one bending operation and the other sweep for supporting the coil portions in the next succeeding bending operation, and driving means between the bending means and the sweep structure for swinging the sweep structure with the bending means during a bending operation and arranged and constructed for return movement of the bending means to rest position independently of movement of the sweep structure.

4. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely positioned sweeps, one sweep for supporting the coil portions in one bending operation and the other sweep for supporting the coil portions in the next succeeding bending operation, driving means between the bending means and the sweep structure for swinging the sweep structure with the bending means during a bending operation and arranged and constructed for return movement of the bending means to rest position independently of movement of the sweep structure, and means for indexing the sweep structure to locate a sweep in position for receiving advancing coil portions.

5. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely positioned sweeps, one for supporting the coil portions in one bending operation and the other for supporting the coil portions in the next succeeding bending operation, driving means actuated by the bending means for swinging the sweep structure in each successive bending operation characterized in that the driving means is inoperative to swing the sweep structure as the bending means moves from a position at the completion of a bend back to rest position.

6. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely positioned sweeps, one for supporting the coil portions in one bending operation and the other for supporting the coil portions in the next succeeding bending operation, driving means actuated by the bending means for swinging the sweep structure in each successive bending operation characterized in that the driving means is inoperative to swing the sweep structure as the bending means moves from a position at the completion of a bend back to rest position, and indexing means for locating the sweep structure when the driving means is inoperable on the sweep structure.

7. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely positioned sweeps for wiping the surface of the table, one sweep supporting formed coil portions in one bending operation and the other sweep supporting the formed coil portions in the next succeeding bending operation, driving means operated by the bending means for swinging the sweep in opposite directions as the successive bends are made, and being arranged and constructed for movement of the bending means from a position at the completion of a bend back to the rest position, whereby the sweeps are alternately located to receive the coil portions and for supporting the same as the coil portions are swung, and yieldable stop means for yieldably checking the swinging movements of a sweep structure.

8. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely positioned sweeps for wiping the surface of the table, one sweep supporting formed coil portions in one bending operation and the other sweep supporting the formed coil portions in the next succeeding bending operation, driving means operated by the bending means for swinging the sweep in opposite directions as the successive bends are made, and being arranged and constructed for movement of the bending means from a position at the completion of a bend back to the rest position, whereby the sweeps are alternately located to receive the coil portions and for supporting the same as the coil portions are swung, yieldable stop means for yieldably checking the swinging movements of a sweep structure, and yieldable means for checking the rebound of the yieldable stop means and for indexing the sweep structure to locate one of the sweeps in a position to receive the advancing tube and coil portions.

9. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely positioned sweeps for wiping the surface of the table, one sweep supporting formed coil portions in one bending operation and the other sweep supporting the formed coil portions in the next succeeding bending operation, driving means operated by the bending means for swinging the sweep in opposite directions as the successive bends are made, and being arranged and constructed for movement of the bending means from a position at the completion of a bend back to the rest position, whereby the sweeps are alternately located to receive the coil portions and for supporting the same as the coil portions are swung, and yieldable means for checking the swinging movements of the sweep structure and for indexing the sweep structure to locate one sweep in a position to receive the advancing tube and coil portions.

10. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely disposed sweeps, one for supporting the coil portions as said coil portions are swung in one bending operation and the other for supporting the coil portions as the coil portions are swung in the opposite direction in the next succeeding bending operation, and driving means between the bending means and the sweep structure providing a lost play action so that the bending means may move from the position of rest to a position of purchase on the work piece prior to movement of the sweep structure, said driving means being characterized in that the bending means may move from a position at the completion of a bend back to rest position without movement of the sweep structure.

11. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially oppositely disposed sweeps, one for receiving and supporting the formed coil portions in one bending operation and the other for receiving and supporting the coil portions in the next succeeding bending operation, driving means operated by the bending means characterized in that the same is operable to swing the sweep structure in opposite directions as successive bending operations are formed while allowing movement of the bending means from a position of bend completion back to rest position without movement of the sweep structure, and a control device on each sweep arranged to be engaged by the advancing stock to terminate the advancing action of the stock.

12. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially opposite sweeps, one for receiving and supporting the formed coil portions in one bending operation, and the other for receiving and supporting the bending portions in the next succeeding bending operation, driving means operated by the bending means and engageable with the sweep structure to swing the same in each bending operation and releasable from the bending structure for movement of the bending means back to rest position between the bending operations, a relatively strong spring for checking the swinging movements of the sweep structure, and means including a relatively light spring for checking the rebound of the relatively strong spring and for indexing the sweep structure.

13. An apparatus for shaping stock of elongated form, such as tubing, into coils of serpentine form having a succession of reverse bends, comprising bending means alternately operable from a rest position in opposite directions to form reverse bends in the stock, means for advancing the stock between the alternate operations while the bending means is in the rest position, a table upon which the formed coil portions are swung, first in one direction and then the opposite direction from the position of rest as the bending means performs its alternate bending operations, a sweep structure having two substantially opposite sweeps, one for receiving and supporting the formed coil portions in one bending operation, and the other for receiving and supporting the bending portions in the next succeeding bending operation, driving means operated by the bending means and engageable with the sweep structure to swing the same in each bending operation and releasable from the bending structure for movement of the bending means back to rest position between the bending operations, friction means operable on the sweep structure near the end of each swinging movement thereof for decelerating such movement and yieldable stop and indexing means for checking such movement and indexing the sweep structure.

14. In an apparatus having mechanism operated in an oscillatory fashion, means for yieldably checking the oscillatory movements and for indexing the mechanism, comprising an oscillatory shaft, a cross arm mounted on the shaft, relatively strong spring means effective alternately upon opposite ends of the cross arm to yieldably check the oscillatory movements, a relatively light spring means, an inclined face on each end of the cross arm and means for yieldably and disengageably acting on the said inclined faces alternately under the action of the relatively light spring means when the relatively strong spring means is flexed to check the rebound of the relatively strong spring means and to index the mechanism.

15. In an apparatus having mechanism operated in an oscillatory fashion, means for yieldably checking the oscillatory movements and for indexing the mechanism, comprising an oscillatory shaft, a cross arm on the shaft, each end of the cross arm having oppositely disposed inclined faces, each end of the arm carrying a stop projection, a pair of pivoted arms, each for respective engagement with a stop projection on the cross arm, a fixed reaction member disposed between the two pivoted arms, a check spring inter-related with the two arms so that when one stop projection strikes a pivoted arm the reaction member holds the other pivoted arm and the check spring is flexed to yieldably check the movement of the cross arm, a lever engageable by one inclined surface on the end of the cross arm to be actuated thereby, a second spring flexed by the lever, said lever being engageable by the other inclined surface on the cross arm to check the rebound of the first mentioned spring and to index the said mechanism.

ARTHUR W. PAYNE.
ARTHUR M. WALLACE.

REFERENCES CITED

The following references are of record in the file of this patent:

UNITED STATES PATENTS

| Number | Name | Date |
|---|---|---|
| 235,538 | Kilmer | Dec. 14, 1880 |
| 277,010 | Cooper | May 8, 1883 |
| 468,301 | Cooper | Feb. 2, 1892 |
| 679,433 | Sisson | July 30, 1901 |
| 932,191 | Trosiener | Aug. 24, 1909 |
| 957,200 | Gail | May 10, 1910 |
| 958,290 | Plant | May 17, 1910 |
| 1,372,816 | Holmgreen | Mar. 29, 1921 |
| 1,409,837 | Eames | Mar. 14, 1922 |
| 1,432,229 | Anderson | Oct. 17, 1922 |
| 1,546,147 | Skinner | July 14, 1925 |
| 1,873,939 | Mason | Aug. 23, 1932 |
| 2,097,596 | McDougall | Nov. 2, 1937 |
| 2,126,235 | Wesley | Aug. 9, 1938 |

FOREIGN PATENTS

| Number | Country | Date |
|---|---|---|
| 19,521 | Great Britain | Oct. 31, 1900 |
| 229,203 | Germany | Dec. 3, 1910 |
| 508,444 | France | July 24, 1920 |